May 5, 1931. W. TATHAM 1,803,880
BEAN STRINGING AND SLICING IMPLEMENT
Filed Nov. 14, 1928
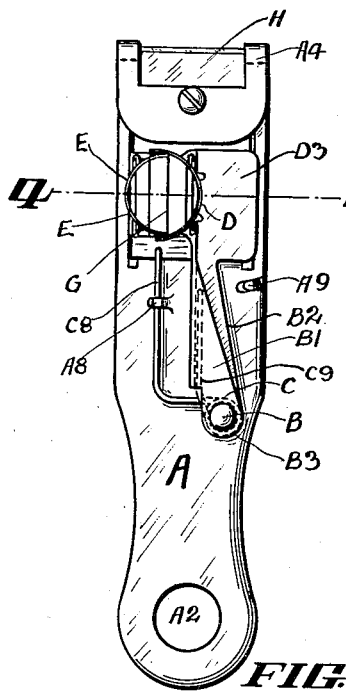
FIG. 1.
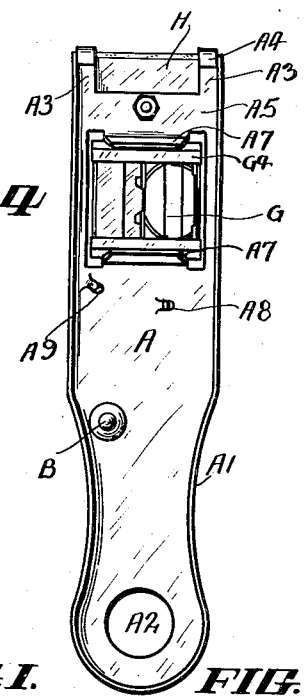
FIG. 2.
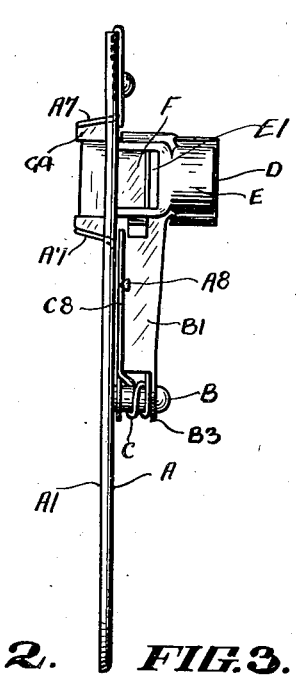
FIG. 3.
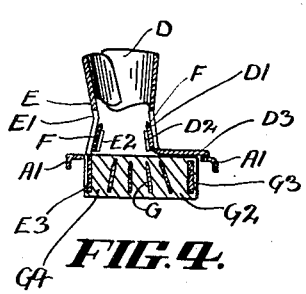
FIG. 4.
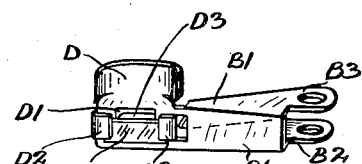
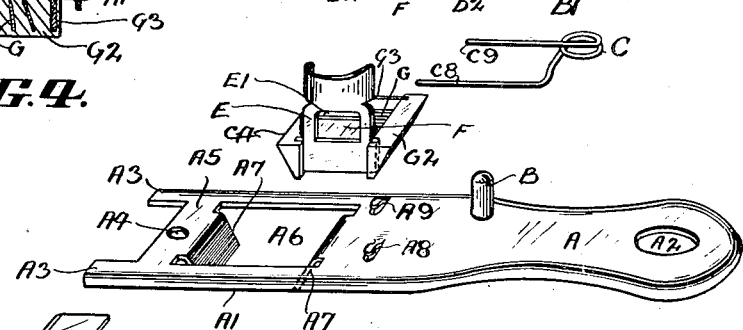
FIG. 5.
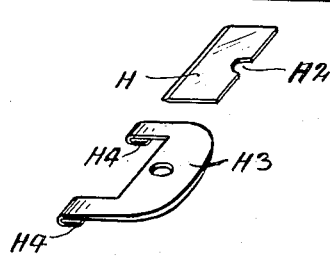
Inventor:
William Tatham
by Victor D Borst
Atty Patented May 5, 1931

1,803,880

UNITED STATES PATENT OFFICE

WILLIAM TATHAM, OF SYDNEY, NEW SOUTH WALES, AUSTRALIA

BEAN STRINGING AND SLICING IMPLEMENT

Application filed November 14, 1928, Serial No. 319,356, and in Australia September 12, 1928.

In implements for stringing and slicing beans or their preparation for cooking and for edible use to which this present invention refers the beans are pushed or pulled endwise between a pair of edge or stringing knives and thence through a gang of other knives for slicing them, and of said first or edge pair of knives one has resilient lateral movement that the space between will automatically accommodate to the varying breadths of the beans operated upon. An early example of such implements has a lengthy flared entrance between two resiliently moving jaws carrying the edge knives which jaws close upon an angularly set guide which directs the bean having its edges cut or stringed to a gang of slicing knives of some relative considerable length the whole being carried upon a plate or base shaped as a hand piece : the knife gang holder has folds for receiving the knives and it takes the hand piece edges at the fore end and at both sides with the knives longitudinally across an opening in said base and in the fore end of the gang holder is carried a further knife for cutting off the ends or "topping" the beans. This construction was preceded by a similar one much more expensive to produce in which the base was of shaped or cast or stamped construction of greater weight but possessing the same features but with no fore topping knife. These two models are possessed of the features claimed by inventor Charles Henry Eyre who was granted Letters Patent of the Commonwealth of Australia No. 10867/23 dated 30th January 1923. To economize in the cost of construction of such implement present applicant invented certain improvements thereto for which his assignee Arthur George Hebblewhite was granted Australian Letters Patent No. 17968 of 27th May, 1924, in which though laterally separable one resiliently moveable jaw holding one edge or stringing knife meets or joins a stationary holder for the other edge or stringing knife and said jaw and holder are surmounted each by walls of arcuate or of near semi-circular form the ends of the moveable jaw one embracing the ends of the stationary one and forming a deeply flared constricting and enlarging gullet for the directing of the stringed bean rectangularly instead of angularly through the gang of slicing knives below and in this model the gang of slicing knives rested in the folds of cross strips clipped across a gap or passage in the hand piece. A later model according to Australian Letters Patent No. 6624 of 10th May, 1927, contemplates reversion to the original ideas of the first herein mentioned Australian Patent No. 10867/23 but in it the edge or stringing knives are mounted on two moveable jaw arms on a common pivot with also an actuating helical connecting spring thereon and the gap or bean passage in the hand piece is peculiarly formed its ends providing tubes each for a pin on which are threaded the gang of slicing knives having end holes as said knives are deposited at both ends in kerfs partly through said tubes.

And this invention has been specially devised for the improvement of such implements and for effecting their more advantageous construction and operation resulting in the production of such implements of more lasting bore efficatious and cheaper character and having all of their respective components easily and quickly replaceable and having their respective cutting knives or blades made of wafer razor blade. And this by means of these present improvements which hereinafter are particularly described and explained and specifically claimed.

An improved bean stringing and slicing implement according to these improvements has a pressed metal rolled or flanged edged hand piece or base having at its fore end an inset leaving two horns protruding from said base. Aft of these two horns is a medial orifice for the taking therethrough of a bolt or screw for the medial hole of the holder of a bean topping blade which holder rests on the base top and has two horns forwardly with turned-under ends forming clips to hold the tops blade and to abut against the base horns. The tops knife holder being released from the handpiece a blade is inserted under the turned-unders of said knife holder and then the holder bolted or screwed in place through the medial holes of the parts with the back edge of the blade abutting the medial bolt with or without an arcuate or other inset to take against the bolt (or there might be a medial hole through the blade to take over the fastening bolt) the turned-under ends taking over the ends of the base piece horns and the rear of the holder taking flush partly over the slicing knives gang holder hereinafter referred to.

Rearwardly of the topping knife fastening, just above described, the hand piece or base has a front and rear rectangular taper flanged orifice or gap for the receiving therein just tightly between the flanges a removable gang holder or frame in which are set in slots in both ends of the frame across the space a plurality or gang of stringing blades. These end frames are of the same depth as the end flanges of the gap in the base and of a width suitable for blade kerfs and they are made of more or less malleable cast metal while they are joined by strong rigid metal as side frames and they rest in the base gap flush with the upper face of the base and flush with the lower edges of the end flanges of said gap. And this slicing knives holder is retained in set position by the bottom of the abovementioned bean tops knife holder and/or by an extension of the spring of the movable part of the bean feed passage or semi-gullet pair.

There is a fixed pressed metal semi-gullet reaching to the gang slicing knives holder with its lower part forming one of the sides of such holder from whence it rises and has clips to take therein one stringing blade angularly set to the base below a space or string discharge aperture and then rises slightly inclined outwardly semi-circularly as a part throat. The other semi-gullet has from a flange base a similar apertured wall clipped in stringing blade and a circular part throat which latter overlaps the companion semi-gullet. The wall of the moveable semi-gullet also of pressed metal extends as a radial arm in channel form on the base rearwardly to an anchored stud or pivot on the hand piece on which pivot it has loose bearing and between the flanges thereof on the pivot is a spring of helical construction with protruding spreading ends one end thrusting on the web of the gullet arm to keep the moveable semi-gullet resiliently overlapping or against its fixed counterpart while the other end of said spring has abutment against a tang or catch on the base and its end preferably extends over the rear end frame of the slicing knives box holder and holds same in position. And there may be another tang or catch on the base as a stop to the outward travel of the moving semi-gullet.

The slicing knives of the gang holder are of wafer razor blade and they are peculiarly set in said gang holder each succeeding blade diverging from its preceding neighbour at a slightly larger angle for the purpose of providing easy get-a-way of the bean slices.

But in order that this invention may be readily carried into practical effect it will now be described in detail with reference to the drawings accompanying and forming part of this complete specification. Figs. 1 and 2 are respectively an upper and a lower face view of an improved bean stringing and slicing implement constructed accordingly and embodying these present improvements and Fig. 3 is a left hand edge view of same while Figs. 4 and 5 show components of the implement in disassemblage the characteristics of each of which are hereinafter individually expounded.

The base or hand piece A is of pressed metal having a surrounding roll or flange A1 and a hanging aperture A2 while its fore end has side extensions or horns A3 with aft thereof a bolt hole A4 through a bar A5 separating said horns from the bean passage or gap A6 which in its stamping out or cutting and/or bending is formed with fore and aft inwardly inclined under flanges A7 for supporting the slicing knives gang holder and acting as an abutment against the pressure of the passing being-sliced bean. Rearwardly of the gap A6 the hand piece is nicked or cut for the formation of tangs or catches A8 and A9 and further aft still there is riveted to and in the plate a stud or pivot.

This stud is the pivot B of the resiliently moving gullet arm B1 of channel section having on its web top and bottom flanges or flats B2 and B3 with orifices therein for threading the whole on pivot B with between said flats B2, B3 the helical spring C with spreading limbs the first C8 of which limbs is grasped by catch A8 while the other limb C9 is normally resiliently thrusting against the web of gullet arm B1 to close said arm inwardly and is prevented from excessive reverse movement by the tang A9.

The web of gullet arm B1 extends forwardly and expands upwardly with a minimum taper or flare into an arcuate more or less semi-circular semi-gullet D and downwardly into a holder (below a slot or aperture D1) having end folds forming clips D2 in which fits a stringing blade F with its back resting on the farther but lower expansion of arm B1 into a flange forming part base D3.

A similar semi-gullet E which the fore and aft ends of semi-gullet D slightly overlap has similar aperture E1 and has similar holding clips E2 for a corresponding stringing blade F and it has further downward extension E3 immersed and hidden in and fast to the same and forms one side G3 of the gang holder G2 of the slicing blades G. And there is a parallel complementary side G3 of this holder and both said sides are fixed or cast in ends G4 of strong and rigid but somewhat malleable metal with more or less rectangular upper and lower and internal faces and outer faces of complementary angular set to that of the inclined under flanges A7 of the gap. And the ends G4 have kerfs perculiarly set for holding the blades G inserted therein on what may be termed the common bottom. And this holder for said kerfs is thrust hard into the seating formed by said flanges A7 by the encroachment over the holder rear end by the spring end C8 and as well by the overlap of the tops knife holder. The individual slicing blades of the mentioned gang are set not parallel to one another nor yet flaringly from the medial knife but the first or the nearest to the stationary stringing knife is practically set in parallel plane to the passage while each of the others in succession have increasing flare from the preceding one.

The tops blade H has a middle semi-circular indent H2 and its holder H3 has turned-in horns H4 forming clips which end clip said knife H and also the horns A3 of the hand piece A and a bolt H5 passed through hole A4 and indent H2 the knife H and as well the holder H3 firmly secures these parts together and to hand piece A.

Although the implement of this specification may be described as in the foregoing having "fore" and "aft" parts and "upper" and "lower" parts it is to be understood that the mentioned adjectives are only used in relative sense for the implement is in practice handled in most convenient relation to its task that is ordinarily uprightly with one hand grasping the stated "aft" or handle part while the ends of bean are struck in turn over the now standing up tops knife H with the other hand. And said topped pod is then thrust between the semi-gullets D and E and pushed past the stringing blades D2 and E2 which shave off the strings and further forced past slicing blades F until it is sufficiently sliced through to enable the hand to grasp such sliced part and draw it and its remainder through completely sliced to be deposited in any convenient receptacle.

The "tops" knife arrangement is of novel construction and enables a quick replacement of blade H whenever this is necessary for by releasing the bolt H5 the knife holder H3 may be drawn forwardly the old blade H removed and a new one abutted against said bolt H5 when the holder H3 being slided aft said bolt H5 can be inserted again through its hole A4 and the whole tightened up. And the aft end of this holder H3 overlapping the slicing blade holder assists in keeping said holder firmly in place.

The minimum taper or flare of the meeting semi-gullets D and E insures that the passing bean or pod is directed on to both stringing or edges knives D2 and E2 so that in every case only a minimum quantity of edge known as "string" will be shaved from the width of such pod and as the movable semi-gullet D resiliently keeps it in such proper relation to the stringing blades D2 and E2 the described construction of two-part gullet is of great usefulness.

The arrangement of the stationary semi-gullet E with its embracing companion semi-gullet D resiliently pressing towards the first simplifies the whole implement and ensures better results in the operations of stringing the bean pod and feeding it onto and past the slicing knives G.

The setting of moveable semi-gullet D and the gullet arm B1, B2, B3 thereof upon an aft pivot B with an operating spring C, C8, C9 also on said pivot B is of novel and effective and cheaper construction that any heretofore made and lessens the weight of the implement to considerable extent as well so does the particular constructions of said gullet arm B1, B2, B3 and of spring C, C8, C9 and the arrangement of these together upon the handpiece A.

The provision of the taper under flanges A7 of a gap A6 aft of cross bar A5 from and or in the plate hand piece A cheapens to a marked extent the making of said handpiece and forms a holding abutment for the holder of slicing blades G much more suitable for its purposes than those hitherto proposed and also allows of the use of a more effective and stronger gang holder G2, G3 for a slicing blades of less length than heretofore and one from which old blades G can be simply released and new blades supplied in place thereof in a compartively very short period of time. And the peculiar construction of this slicing knife gang holder G2, G3 is of paramount importance making as it does a stronger and more certain and more easily supplied gang of knives than any hitherto available. It is only necessary to release the holding bolt H5 of the fore tops knife holder H3 slide such holder forwardly clear of the slicing knives and push the movable gullet arm B1, B2, B3 sidewardly to greatest extent when the latter holder can be lifted from under the end of the gullet arm spring C8 and new blades supplied thereto and be restored to position.

I claim:—

1. In a bean stringing and slicing implement, a base having parallel horns formed at one end thereof, a topping blade adapted to lie across the horns formed on the end of the base, a holder having horns similar to the horns formed on the base, the ends of the horns on the holder being reversely bent to form clips which engage the topping blade and the ends of the horns formed on the base, and means for securing the holder to the base to hold the topping blade in position.

2. In a bean stringing and slicing implement, a base having parallel horns formed at one end thereof, a topping blade adapted to lie across the horns formed on the end of the base, the ends of the horns on the holder being reversely bent to form clips which engage the topping blade and the ends of the horns formed on the base, and means for securing the holder to the base to hold the topping blade in position, said securing means constituting an abutment for the rear edge of the topping blade.

3. A bean stringing and slicing implement comprising a base, a two part gullet mounted on said base, one of the parts of the gullet being stationary with respect to the base, and the other part of the two part gullet being movable with respect to the base, an arm extending from the movable part of the gullet, a pivotal connection between the arm and base, and a spring cooperating with said pivotal connection and resiliently urging the movable part of the gullet toward the stationary part.

4. A bean stringing and slicing implement comprising a base, a two part gullet mounted on said base, one of the parts of the gullet being stationary with respect to the base, and the other part of the two part gullet being movable with respect to the base, a gang holder for holding a plurality of slicing knives below the base in alignment with the gullet, the stationary part of the gullet having an extension forming one side of said gang holder, a pivot secured to the base, a channel shape arm extending from the movable part of the gullet and having openings through the flanges thereof to engage the pivot secured to the base, and a spring member resiliently urging the movable part of the gullet towards the stationary part thereof.

5. A bean stringing and slicing implement comprising a base having an opening therein, flanges extending downwardly from opposite sides of the opening in the base, a gang holder in the opening in the base between said flanges, the gang holder having kerfs in the sides thereof in contact with the flanges, slicing knives in the kerfs in the sides of the gang holder, a two part gullet mounted on the base above the opening therein, one of the parts of the gullet being stationary with respect to the base and having an extension thereon extending below the base and forming one side of the gang holder, the other part of the two part gullet being movable with respect to the base, a channel shape arm extending from the movable part of the gullet, a pivotal connection between the arm and the base, and a spring resiliently urging the movable part of the gullet toward the stationary part thereof.

6. A bean stringing and slicing implement comprising a base having an opening therein, converging flanges extending downwardly from opposite sides of the opening in the base, a gang holder having converging sides complementary to the converging flanges extending from the base in the opening in the base between said flanges, the gang holder having kerfs in the sides thereof in contact with the flanges, slicing knives in the kerfs in the side of the gang holder, a two part gullet mounted on the base above the opening therein, one of the parts of the gullet being stationary with respect to the base and having an extension thereon extending below the base and forming one side of the gang holder, the other part of the two part gullet being movable with respect to the base, a channel shape arm extending from the movable part of the gullet, a pivotal connection between the arm and the base, and a spring resiliently urging the movable part of the gullet toward the stationary part thereof.

7. In a bean stringing and slicing implement a gang holder for holding a plurality of slicing knives comprising two opposed end pieces having kerfs therein to receive the ends of the knives, and two side pieces uniting the two end pieces, one of said side pieces being extended above the end pieces and forming a part of a two part gullet.

In testimony whereof I have signed my name to this specification.

WILLIAM TATHAM.